United States Patent [19]

Murphy

[11] Patent Number: 5,536,170
[45] Date of Patent: Jul. 16, 1996

[54] INTERCHANGEABLE SYMBOLIC LANGUAGE OVERLAY SYSTEM FOR PUSH BUTTON OPERATED DEVICE

[76] Inventor: Kevin C. Murphy, 97 Forrest St., Plaistow, N.H. 03865

[21] Appl. No.: 290,601

[22] Filed: Aug. 15, 1994

Related U.S. Application Data

[63] Continuation-in-part of Ser. No. 74,795, Jun. 10, 1993, Pat. No. 5,391,078.

[51] Int. Cl.⁶ ..................................................... G09B 21/00
[52] U.S. Cl. ............................................. 434/113; 434/227
[58] Field of Search ................................... 434/112, 113, 434/227, 118, 219; 150/165

[56] References Cited

U.S. PATENT DOCUMENTS

| | | | |
|---|---|---|---|
| 1,823,130 | 9/1931 | Smith | 434/227 X |
| 3,776,088 | 12/1973 | Jones | 84/317 |
| 5,096,317 | 3/1992 | Phillippe | 434/227 X |
| 5,391,078 | 2/1995 | Murphy | 434/113 |

*Primary Examiner*—Gene Mancene
*Assistant Examiner*—Jeffrey A. Smith
*Attorney, Agent, or Firm*—Daniel J. Bourque; Kevin J. Carroll

[57] ABSTRACT

A tactile recognition language overlay system includes a piece of pliable material for covering a pressure sensitive or push button operated device, such as a keyboard or control panel. The piece of pliable material includes depressible portions which move below the piece of pliable material to contact detection regions disposed on the pressure sensitive device, such as keys on a keyboard. Each depressible portion has an engaging region which is adapted to engage a tactile recognition language block having at least a tactilly recognizable character, such as a Braille character. The tactile recognition language blocks may also include visual indicia. The depressible portions and engaging regions are spaced and oriented in a predetermined pattern corresponding to detection regions on the pressure sensitive device. A plurality of tactile recognition language blocks may be selectably and removably engaged with the engaging regions to form an interchangeable combination of tactilly recognizable characters which overlay and correspond to the pressure sensitive device.

23 Claims, 3 Drawing Sheets

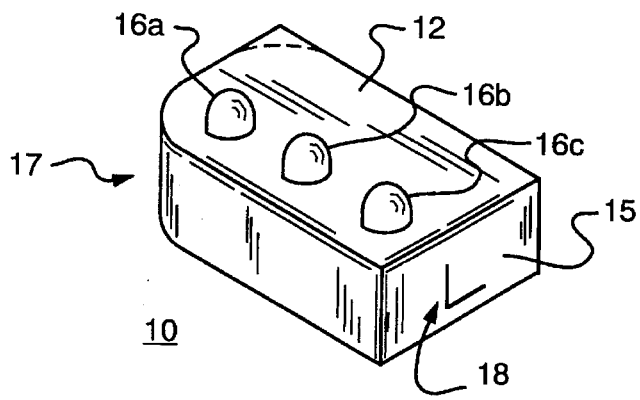
FIG. 3
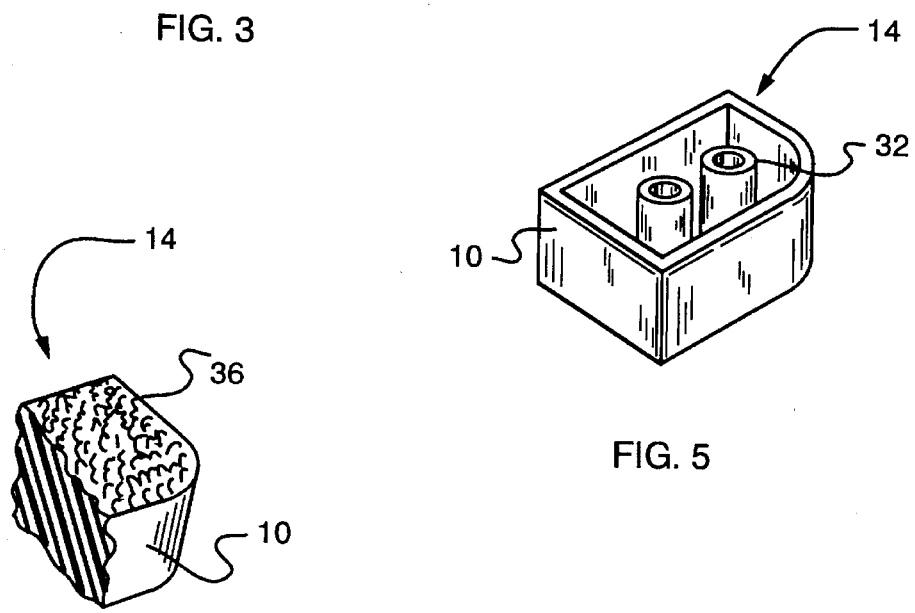
FIG. 5
FIG. 6
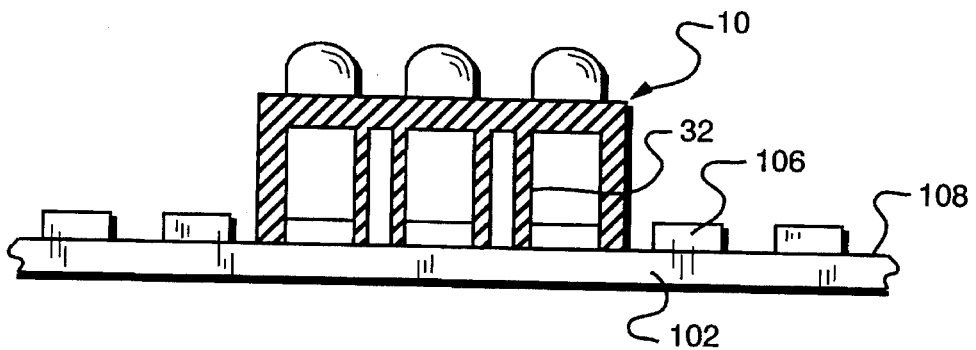
FIG. 4

INTERCHANGEABLE SYMBOLIC LANGUAGE OVERLAY SYSTEM FOR PUSH BUTTON OPERATED DEVICE

RELATED APPLICATIONS

This Application is a continuation-in-part of U.S. patent application Ser. No. 08/074,795 now U.S. Pat. No. 5,391,078 issused on Feb. 21, 1995, entitled SYMBOLIC LANGUAGE TEACHING AN COMMUNICATIONS SYSTEM UTILIZING TACTILE PATTERN DISCRIMINATION and filed Jun. 10, 1993 which is fully incorporated herein by reference.

FIELD OF THE INVENTION

This invention relates to a teaching and communication system for a symbolic language which utilizes tactile or touch pattern discrimination, such as Braille, and more particularly, to an overlay or template for one or more push button activated devices, such as a computer keyboard, to adapt the keyboard for tactile recognition by a visually impaired user.

BACKGROUND OF THE INVENTION

Many mechanical and electronic devices or equipment require a user to interact with the device by depressing keys on a keyboard, such as a computer keyboard or musical keyboard, or other such pressure sensitive devices. Keyboards or other pressure sensitive devices including equipment or machinery operator controllers are often marked with visual indicia to allow a user to know which key must be depressed. Such indicia, however, is not recognizable by a visually impaired individual, and accordingly, the devices are not adapted for use by a visually impaired individual. Thus, using or educating for use of devices such as computer keyboards, musical keyboards and other button operated equipment, devices or machinery by visually impaired individuals is difficult and may even be impossible.

Devices exist for teaching or communicating a symbolic tactile recognition language, such as Braille. For example, U.S. Pat. No. 4,880,384 by the inventor of the present invention shows such a device with blocks having a Braille character which may be interchangeably arranged and fixed to a board to form words and sentences. However, this apparatus is not adapted to be used with a keyboard or other such pressure sensitive device because the individual blocks and rigid board may not be easily mounted to a such a device.

Accordingly, what is needed is an interchangeable overlay system which covers a keyboard or other similar pressure sensitive device and which is made of a flexible material to allow for depressing of keys on the keyboard. Further, the overlay should be adapted to removably engage with blocks having a character which is recognized by touch, such as a Braille character, and recognized visually, so that the keyboard can be interchangeably adapted for interaction with a visually impaired individual. Both the overlay and the individual block should be easily mountable and removable for increased flexibility in adapting the keyboard for use by visually impaired individuals.

SUMMARY OF THE INVENTION

The present invention features a tactile recognition language overlay system for use with at least one pressure sensitive device having a pressure detection region, such as, for example, a computer keyboard, musical keyboard, machinery or equipment operator control panel. The tactile recognition language overlay comprises a piece of pliable material adapted to cover the at least one pressure sensitive device. Depressible portions of the pliable material are moveable below a plane of the piece of pliable material to contact respective detection regions of each of the pressure sensitive devices. An engaging region is disposed on the top surface of each depressible portion of the pliable material, for engaging a tactile recognition language block having at least a tactilly recognizable region.

In the preferred embodiment, the piece of pliable material has a generally rectangular shape, is approximately one/eighth of an inch thick and is made of nylon, acrylic or other similar material. In the preferred embodiment, the pliable material includes a plurality of depressible portions and corresponding engaging regions spaced and oriented in a predetermined arrangement to correspond with an arrangement of detection regions on the pressure sensitive device.

Each depressible portion preferably has at least one edge which is detached from the piece of pliable material to allow the depressible portion to move below the plane of the pliable material to contact the detection region of the pressure sensitive device. In a preferred embodiment, each depressible portion has a single hinged edge integral with the piece of pliable material and several remaining edges detached from the piece of pliable material so that the depressible portion bends along the single hinged edge to move below the plane of the piece of pliable material.

In the preferred embodiment of the tactile recognition language overlay system, engaging regions provided on the pliable material are removably engaged with tactile recognition language blocks having both a tactilly recognizable region and a visually recognizable region. In the preferred embodiment, the visually recognizable region includes a visually recognizable character corresponding to a tactilly recognizable character disposed on the tactilly recognizable region. Typically, the tactilly recognizable character is a Braille character and may be a number, letter or symbol in any language. In the preferred embodiment, a plurality of tactile recognition language blocks are removably and selectably engagable with the engaging region to form an interchangeable combination of characters, words, numbers or symbols, as appropriate corresponding to the function of the detection regions disposed on the pressure sensitive device.

In one embodiment, the engaging regions include engaging members disposed on the top surface of the depressible portion for frictionally removably engaging with corresponding engaging members on a tactile recognition language block. In an alternative embodiment, the engaging region may include a hook/pile coupling region disposed on the top surface of the depressible portion for engaging a corresponding hook/pile coupling region on a tactile recognition language block. Other similar types of engaging means are possible within the scope of the invention.

DESCRIPTION OF THE DRAWINGS

These and other features and advantages of the present invention will be better understood by reading the following detailed description, taken together with the drawings wherein:

FIG. 3 is a perspective illustration of a tactile recognition language teaching and communication block adapted to be engaged with the overlay according to one embodiment of the present invention;

FIG. 4 is a side view of a tactile recognition language teaching and communication block engaged with a symbolic tactile recognition language overlay according to the present invention;

FIG. 5 is a perspective illustration of the engaging members of a tactile recognition language teaching and communication block of the present invention; and FIG. 6 is a partial illustration of an alternative embodiment of the engaging members of a tactile recognition language teaching and communication block.

DETAILED DESCRIPTION OF THE PREFERRED EMBODIMENT

Figure 1:
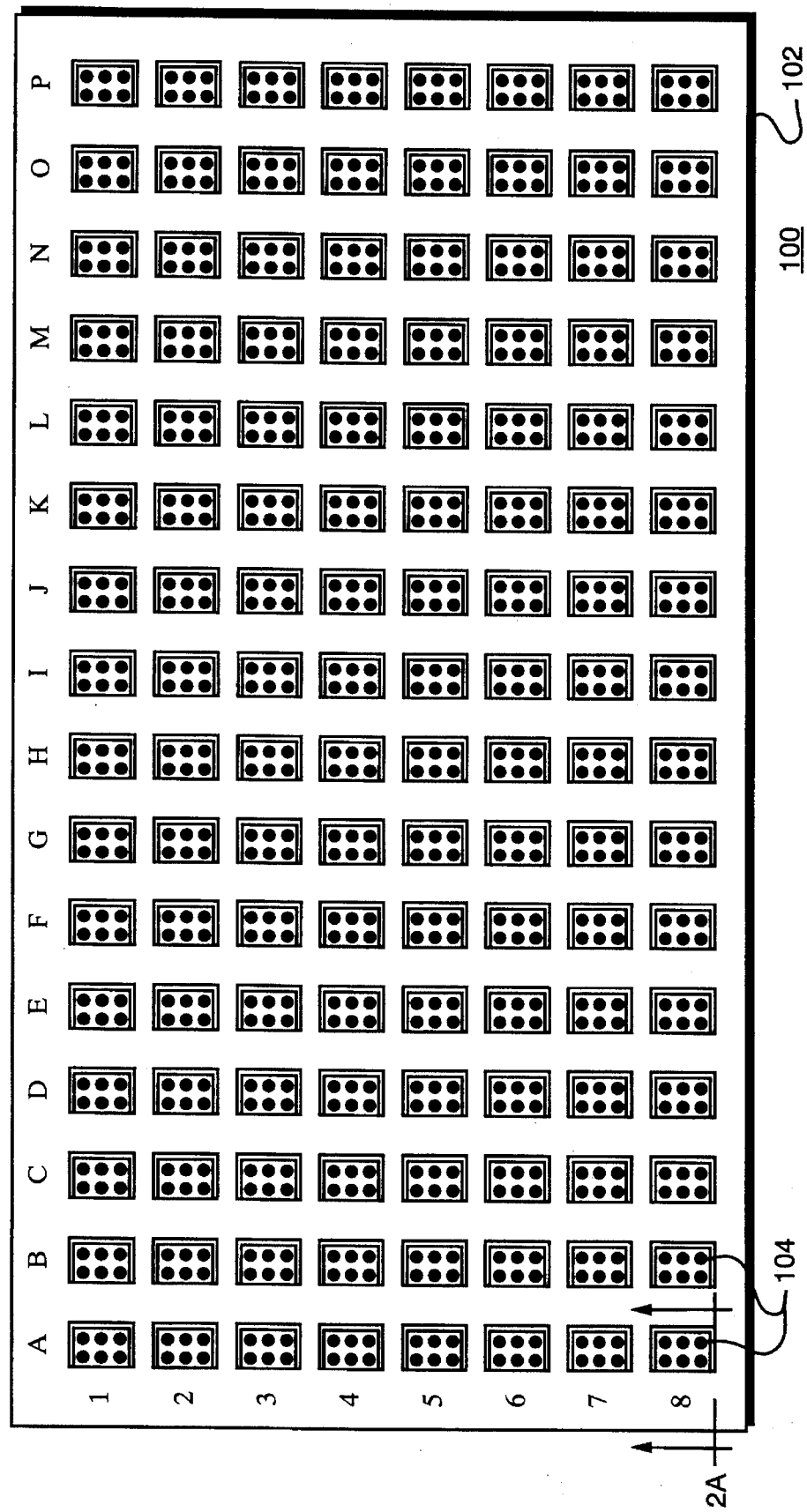
FIG. 1 is a top view of a tactile recognition language overlay according to the present invention.

A symbolic tactile recognition language overlay system for a push button operated device includes an overlay or template with tactilely recognizable regions disposed on at least a top surface of the template or overlay, for allowing a visually impaired individual to recognize and activate keys or buttons on a pressure sensitive or push button operated device. A symbolic tactile recognition language overlay or template 100 according to one embodiment of the present invention is shown in FIG. 1. The overlay or template 100 includes a piece of soft, pliable material 102 which covers a pressure sensitive or push button operated device such as a keyboard. The overlay 102 is preferable made of nylon, acrylic, or other similar soft, pliable type of materials. The overlay or template 100 further includes depressible portions 104 in a predetermined arrangement on the soft, pliable material 102 corresponding to the arrangement of keys or buttons on a pressure sensitive device to be disposed below the overlay or template 102.

The overlay or template 100 is shown, for exemplary purposes of a type having depressible portions 104 which are arranged to overlay a UNICORN keyboard designed for the disabled. Other arrangements of depressible portions are possible to overlay various types of pressure sensitive devices including, but not limited to, computer keyboards, musical keyboards, control panels for machinery, etc. The depressible portions may be spaced and oriented to correspond to detection regions, such as keys or buttons, of any such pressure sensitive device.

Figure 2A:
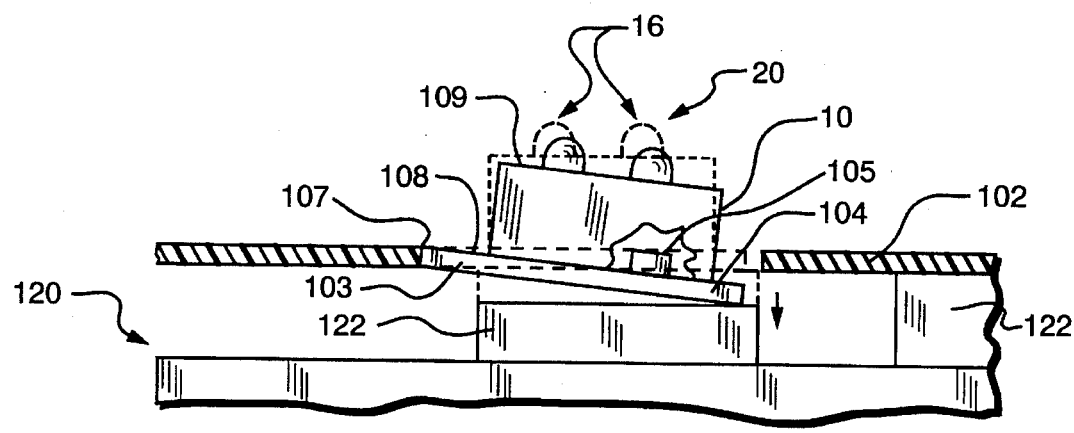
FIG. 2A is a partial sectional view of the tactile recognition language overlay covering a pressure sensitive device and depressing a detection region according to the present invention.

Each depressible portion 104 on the soft liable material 102 overlays a pressure detection region 122 such as keys or buttons on a pressure sensitive operated device 120, FIG. 2A, such as a keyboard or other push button operated device. The depressible portions 104 have corresponding tactilly recognizable regions 20 including protrusions 16 disposed on top surface 109 of tactile recognition blocks 10, so that a visually impaired individual may locate the tactilely recognizable region and thereby activate the pressure detection regions 122 to use and interact with the pressure sensitive device 120.

The depressible portions 104 are moveable below a plane of the piece of soft pliable material 102 so that a corresponding detection region 122, such as a key or button, may be depressed or contacted by a user of the keyboard or pressure sensitive device 120. In the preferred embodiment, the depressible portion 104 has edges 103 which are detached from the soft pliable material 102 and a single hinged edge 107 which remains integral with the soft pliable material 102. Thus, when depressible portions 104 are pressed downwardly against a key or detection region 122, the depressible portion bends along the hinged edge 107 and the detached edges 103 move below the plane of the soft pliable material 102. When released, the depressible portion 104 may then return to the original position.

In a preferred embodiment, tactilly recognizable regions 20 including protrusions 16 are formed on tactile recognition language blocks 10 which are engagable with engaging regions 105 formed on the depressible portions 104 of the tactile recognition language overlay 100. Thus, tactilly recognizable regions 20 are disposed on the overly 100 by engaging tactile recognition blocks 10 with tactile recognition block engaging regions 105 on an engaging surface 108 of depressible portions 104. In the preferred embodiment, the tactile recognition language blocks 10 are removably engaged with the engaging regions 105 of the template or overlay 100 so that the blocks may be arranged interchangeably.

Each tactilly recognizable region 20 includes one or more protrusions 16 representing a character, combination of characters or symbol which a visually impaired individual recognizes by touching. Tactile recognition language teaching and communication blocks 10 may be selectably and interchangeably arranged on the engaging regions 105 of the overlay or template 100 to form different combinations of characters or symbols. When a visually impaired user tactilly recognizes the character or symbol on the block 10, the user may activate the corresponding detection region 122 by depressing the block 10.

Figure 2B:
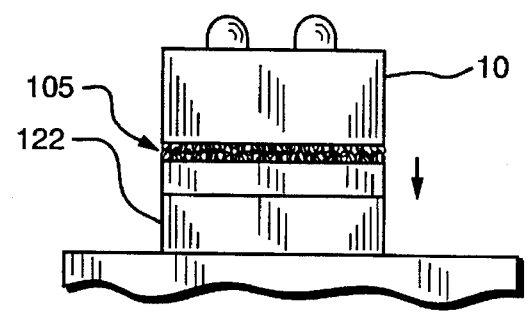
FIG. 2B is a partial side view of a tactile recognition language teaching and communication block directly mounted on a pressure detection region.

The present invention also contemplates fixing or coupling a tactile recognition language teaching and communication block 10 directly to a pressure detection region or key 122, FIG. 2B. For example, a block 10 could be removably fixed to engaging regions 105 on the key 122, such as a hook/pile coupling region.

In a preferred embodiment, the tactile recognition language blocks 10 are tactile recognition language teaching and communication blocks with both tactilly and visually recognizable characters such as disclosed in co-pending U.S. patent application Ser. No. 08/074,795 now U.S. Pat. No. 5,391,075 issue on Feb. 27, 1995 by the inventor of the present invention, and incorporated herein by reference.

In this preferred embodiment, the block 10, FIG. 3 includes raised protrusions 16a, 16b, 16c arranged in a predetermined pattern on a top surface 12 of the block 10 to form the tactilly recognizable region 20 representing a character or combination of characters such as alpha-numeric Braille characters. Preferably, the raised protrusions 16a–16c have rounded top portions for facilitating tactile discrimination and recognition of the character or symbol represented. The preferred embodiment of the tactile recognition language block 10 further includes visually discernable indicia 18 on one side 15 of the block which corresponds to the character represented by the arrangement of raised protrusions 16a–16c. The preferred tactile recognition block also includes a tactilly recognizable deviation, such as a rounded corner portion 17, for orienting the tactile recognition block with respect to the pressure detection region 122.

In one embodiment, the engaging regions 105 of the overlay or template 100 include block engaging members

106, FIG. 4, adapted to frictionally and removably engage with engaging members 32 on a bottom region 14 of each tactile recognition language teaching and communication block 10, FIG. 5. Thus, tactile recognition language teaching and communication blocks 10 may be frictionally engaged with engaging regions 105 having engaging members 106 to form interchangeable combinations of symbols or characters which overlay a pressure sensitive device and are recognizable by both visually impaired and non-visually impaired individuals. Alternative embodiments include hook/pile coupling regions disposed on engaging regions 105 which are adapted to engage corresponding hook/pile coupling regions 36 on a block 10, FIG. 6.

The characters or symbols represented by each tactile recognition language teaching and communication block 10 may be recognized by either a visually impaired or non-visually impaired individual. Thus, a non-visually impaired or sighted individual may arrange the blocks 10 on the overlay or template 100 to form various combinations of characters or symbols on a keyboard or pressure sensitive device 120. The embodiment shown in FIG. 3 shows an English language alphabet representation on block 10. However, the tactilely recognizable regions 20 and visually discernable indicia 18 on blocks 10 may also represent any number, letter or symbol in any language.

One possible application of the present invention is with a Braille alphabet teaching device. An individual who is either visually impaired or non-visually impaired can arrange a pattern of tactile recognition language blocks on the overlay to test a visually impaired user. The user then may depress a button or key corresponding to a requested Braille character or characters and an electronic device such as a computer will indicate if the user's response is correct or incorrect. The electronic device or computer is completely programmable to implement various tests or games for teaching the visually impaired how to read Braille, such as on a UNICORN Keyboard.

Accordingly, the symbolic tactile recognition language overlay system according to the present inventions allows pressure sensitive devices, such as computer keyboards, musical keyboards, or other push button operated panels, to be easily adapted for visually impaired individuals. The overlay may be easily placed over the device so that tactilely recognizable regions correspond to keys or buttons allowing a visually impaired individual to recognize and activate the appropriate key or button. Further, the tactilely recognizable regions are formed on removable blocks which also have visually recognizable indicia, providing flexibility and interchangeability by both visually impaired and non-visually impaired users.

Modifications and substitutions by one of ordinary skill in the art are considered to be within the scope of the present invention which is not to be limited except by the claims which follow.

What is claimed is:

1. A tactile recognition language overlay for use with a pressure sensitive device, said tactile recognition language overlay comprising:

a piece of pliable material adapted to cover at least a portion of at least one pressure sensitive device, said piece of pliable material including at least one depressible portion movable below a plane of said piece of soft pliable material and towards said at least one pressure sensitive device to contact a pressure detection region disposed on said at least one pressure sensitive device; and a tactile recognition language block engaging region disposed on a top surface of said at least one depressible portion of said piece of pliable material, said tactile recognition language block engaging region removably engagable with a tactile recognition language block having at least a tactilly recognizable region.

2. The tactile recognition language overlay of claim 1, further including at least one tactile recognition language block engaged with said tactile recognition language block engaging region disposed on said at least one depressible portion of said piece of pliable material, wherein said at least one tactile recognition language block includes both a tactilly recognizable region and a visually recognizable region.

3. The tactile recognition language overlay of claim 2, wherein said tactilly recognizable region includes at least one protrusion having a rounded top portion.

4. The tactile recognition language overlay of claim 2, wherein said at least one tactile recognition language block includes a rounded corner portion, for orienting said at least one tactile recognition language block with respect to a corresponding said at least one depressible portion.

5. The tactile recognition language overlay of claim 2, wherein said tactilly recognizable region includes a tactilly recognizable character and said visually recognizable region includes a visually recognizable character corresponding to said tactilly recognizable character.

6. The tactile recognition language overlay of claim 5, wherein said tactilly recognizable character is a Braille character.

7. The tactile recognition language overlay of claim 2, further including a plurality of tactile recognition language blocks removably and selectably engaged with a plurality of tactile recognition language block engaging regions disposed on said piece of pliable material, for forming an interchangeable combination of characters corresponding to pressure detection regions disposed on said pressure sensitive device.

8. The tactile recognition language overlay of claim 1, wherein said tactile recognition language block engaging region includes a hook/pile coupling region disposed on said top surface of said at least one depressible portion for engaging a corresponding hook/pile coupling region on said tactile recognition language block.

9. The tactile recognition language overlay of claim 1, wherein said at least one depressible portion includes at least one detached edge which is detached from said piece of pliable material for allowing said at least one depressible portion to move below said plane of said piece of pliable material and toward said pressure sensitive device to contact said pressure detection region.

10. The tactile recognition language overlay of claim 1, wherein said at least one depressible portion includes a single hinged edge integral with said piece of pliable material and a plurality of remaining edges detached from said piece of pliable material, for allowing said at least one depressible portion to bend along said single hinged edge and to move below the plane of said piece of pliable material and towards said pressure sensitive device to contact said pressure detection region.

11. The tactile recognition language overlay of claim 1, further including a plurality of depressible portions and corresponding tactile recognition language block engaging regions spaced and oriented in a predetermined arrangement on said piece of pliable material, said predetermined arrangement corresponding to an arrangement of pressure detection regions disposed on said pressure sensitive device.

12. The tactile recognition language overlay of claim 1, wherein said piece of pliable material has a generally rectangular shape.

13. The tactile recognition language overlay of claim 1, wherein said piece of pliable material is adapted to overlay a computer keyboard.

14. The tactile recognition language overlay of claim 1, wherein said tactile recognition language block engaging region includes block engaging members disposed on said top surface of said at least one depressible portion for frictionally engaging corresponding engaging members on a tactile recognition language block.

15. The tactile recognition language overlay of claim 1, wherein said piece of pliable material includes one material selected from the group consisting of nylon and acrylic.

16. The tactile recognition language overlay of claim 1, wherein said piece of pliable material is approximately ⅛ inches thick.

17. The tactile recognition language overlay of claim 1, wherein said piece of pliable material is adapted to overlay a tactile language teaching device.

18. A tactile recognition language overlay system for use with a pressure sensitive device, said tactile recognition language overlay system comprising:

a piece of pliable material adapted to cover at least a portion of at least one pressure sensitive device, said piece of pliable material including a plurality of depressible portions movable below a plane of said piece of soft pliable material and towards said at least one pressure sensitive device to contact a plurality of respective pressure detection regions disposed on said at least one pressure sensitive device; and a plurality of tactile recognition blocks disposed on said plurality of depressible portions of said piece of pliable material in a predetermined arrangement corresponding to predetermined pressure detection regions of said plurality of respective pressure detection regions of said pressure sensitive device, wherein each tactile recognition block includes at least a tactilly recognizable region.

19. A tactile recognition language overlay system for use with a pressure sensitive device, said tactile recognition language overlay system comprising:

at least one pressure detection region, for activating said pressure sensitive device, said at least one pressure detection region including a tactile recognition block engaging region; and at least one tactile recognition block removably engaged with said tactile recognition block engaging region on said at least one pressure detection region, wherein said at least one tactile recognition block includes at least a tactilly recognizable region, wherein at least a portion of one corner region of said at least one tactile recognition block includes a tactilly recognizable deviation for orienting said at least one tactile recognition block with respect to a corresponding said at least one pressure detection region.

20. The tactile recognition language overlay system of claim 19, including a plurality of pressure detection regions and a plurality of tactile recognition blocks removably engaged with corresponding tactile recognition block engaging regions on said plurality of pressure detection regions, wherein tactilly recognizable regions on said plurality of tactile recognition blocks form an interchangeable series of tactilly recognizable characters.

21. The tactile recognition language overlay system of claim 19, wherein said tactile recognition block engaging region includes a hook/pile coupling region on said at least one pressure detection region, and said at least one tactile recognition block includes a corresponding hook/pile coupling region, for removably engaging said tactile recognition block engaging region on said at least one pressure detection region.

22. The tactile recognition language overlay system of claim 19, wherein said at least one tactile recognition block includes a visually recognizable region corresponding to said at least a tactilly recognizable region.

23. The tactile recognition language overlay system of claim 19, wherein said tactilly recognizable deviation of said at least one tactile recognition block includes a rounded corner portion, for orienting said at least one tactile recognition block with respect to a corresponding said at least one pressure detection region.

* * * * *